United States Patent
Cardinell et al.

(10) Patent No.: US 8,904,058 B2
(45) Date of Patent: Dec. 2, 2014

(54) SELECTING DIRECT MEMORY ACCESS ENGINES IN AN ADAPTOR INPUT/OUTPUT (I/O) REQUESTS RECEIVED AT THE ADAPTOR

(75) Inventors: Charles S. Cardinell, Tucson, AZ (US); Roger G. Hathorn, Tucson, AZ (US); Matthew J. Kalos, Tucson, AZ (US); Timothy J. Van Patten, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 13/118,093

(22) Filed: May 27, 2011

(65) Prior Publication Data

US 2012/0303842 A1 Nov. 29, 2012

(51) Int. Cl.
  *G06F 13/28* (2006.01)
  *G06F 13/00* (2006.01)
  *G06F 9/50* (2006.01)

(52) U.S. Cl.
  CPC .............. *G06F 13/28* (2013.01); *G06F 9/5011* (2013.01); *G06F 9/505* (2013.01)
  USPC ........................................... 710/22; 710/107

(58) Field of Classification Search
  CPC ........ G06F 13/28; G06F 9/5011; G06F 9/505
  USPC .................................................. 710/22, 107
  See application file for complete search history.

(56) References Cited

U.S. PATENT DOCUMENTS

| | | | |
|---|---|---|---|
| 6,192,428 B1 * | 2/2001 | Abramson et al. ............... | 710/52 |
| 6,493,803 B1 * | 12/2002 | Pham et al. .................... | 711/147 |
| 7,293,121 B2 * | 11/2007 | Hayden .......................... | 710/22 |
| 8,037,217 B2 * | 10/2011 | Arroyo et al. ................... | 710/22 |
| 8,103,809 B1 * | 1/2012 | Michels et al. ................. | 710/22 |
| 2002/0166004 A1 | 11/2002 | Kim | |
| 2003/0067930 A1 * | 4/2003 | Salapura et al. .............. | 370/412 |
| 2006/0053236 A1 * | 3/2006 | Sonksen et al. ................. | 710/22 |
| 2008/0126612 A1 * | 5/2008 | Barrow et al. .................. | 710/34 |
| 2008/0267066 A1 | 10/2008 | Archer et al. | |
| 2009/0287857 A1 | 11/2009 | Vu | |
| 2009/0287859 A1 | 11/2009 | Bond et al. | |
| 2011/0041105 A1 * | 2/2011 | Chou et al. .................... | 716/106 |
| 2012/0216188 A1 * | 8/2012 | Tsirkin ............................. | 718/1 |

FOREIGN PATENT DOCUMENTS

EP   1826677   8/2007

* cited by examiner

*Primary Examiner* — Eric Oberly
(74) *Attorney, Agent, or Firm* — David W. Victor; Konrad Raynes Davda & Victor LLP

(57) ABSTRACT

Provided are a computer program product, system, and method for selecting Direct Memory Access (DMA) engines in an adaptor for processing Input/Output requests received at the adaptor. A determination is made of an assignment of a plurality of processors to the DMA engines, wherein each processor is assigned to use one of the DMA engines. I/O request related work for a received I/O request directed to the storage is processed by determining the DMA engine assigned to the processor processing the I/O request related work and accessing the determined DMA engine to perform the I/O related work.

14 Claims, 5 Drawing Sheets

SELECTING DIRECT MEMORY ACCESS ENGINES IN AN ADAPTOR INPUT/OUTPUT (I/O) REQUESTS RECEIVED AT THE ADAPTOR

BACKGROUND OF THE INVENTION

1. Field of the Invention

The present invention relates to a computer program product, system, and method for selecting Direct Memory Access engines in an adaptor for processing Input/Output requests received at the adaptor.

2. Description of the Related Art

In a dual cluster system, each cluster includes a processing complex and cache. Each cluster is assigned a plurality of volumes, where volumes may be grouped in Logical Subsystems (LSSs). Data being written to a volume may be stored in the cache of the cluster to which the data is assigned. Multiple clusters may receive I/O requests from hosts over a network via a shared network adaptor in the storage controller including the dual clusters.

The shared network adaptor may include a plurality of ports on which I/O requests are received, a plurality of DMA engines to transfer data between the clusters and the ports on which the I/O requests are received, and a plurality of processors (or cores on a single central processing unit) to process I/O requests and control the DMA engines to transfer data for the I/O requests. A processor may be assigned or have affinity for particular ports, so only one processor processes the I/O requests for a port and returns complete or data to the assigned port on which the I/O request was initiated. The DMA engines may have affinity or be assigned to particular logical subsystems (LSSs) or volumes, such that the LSS or volume including the target data of the I/O request is used to determine the DMA engine in the adaptor to use to handle the data transfer to or from the clusters.

Each DMA engine includes a completion queue in which the DMA engine queues completes when completing the data transfer to or from the cluster. Any processor can access any of the DMA engines to process the I/O completes in their completion queues when that processor is scheduled to check I/O completes at the DMA engines. The processor adds the I/O complete pulled from the DMA engine completion queue to a port queue in memory specific to the port that received the I/O request subject to the I/O completion. The processor processes I/O completes in the port queues of ports assigned to the processor. However, if the port queue for the port to which the I/O complete relates is empty, then the processor directly processes the I/O complete to return data or acknowledgment on the port to which the I/O complete relates, without queuing that I/O complete on the port queue.

There is a need in the art for improved techniques for selecting DMA engines to use in a network adaptor.

SUMMARY

Provided are a computer program product, system, and method for selecting Direct Memory Access (DMA) engines in an adaptor for processing Input/Output requests received at the adaptor. A determination is made of an assignment of a plurality of processors to the DMA engines, wherein each processor is assigned to use one of the DMA engines. I/O request related work for a received I/O request directed to the storage is processed by determining the DMA engine assigned to the processor processing the I/O request related work and accessing the determined DMA engine to perform the I/O related work.

DETAILED DESCRIPTION

Figure 1:
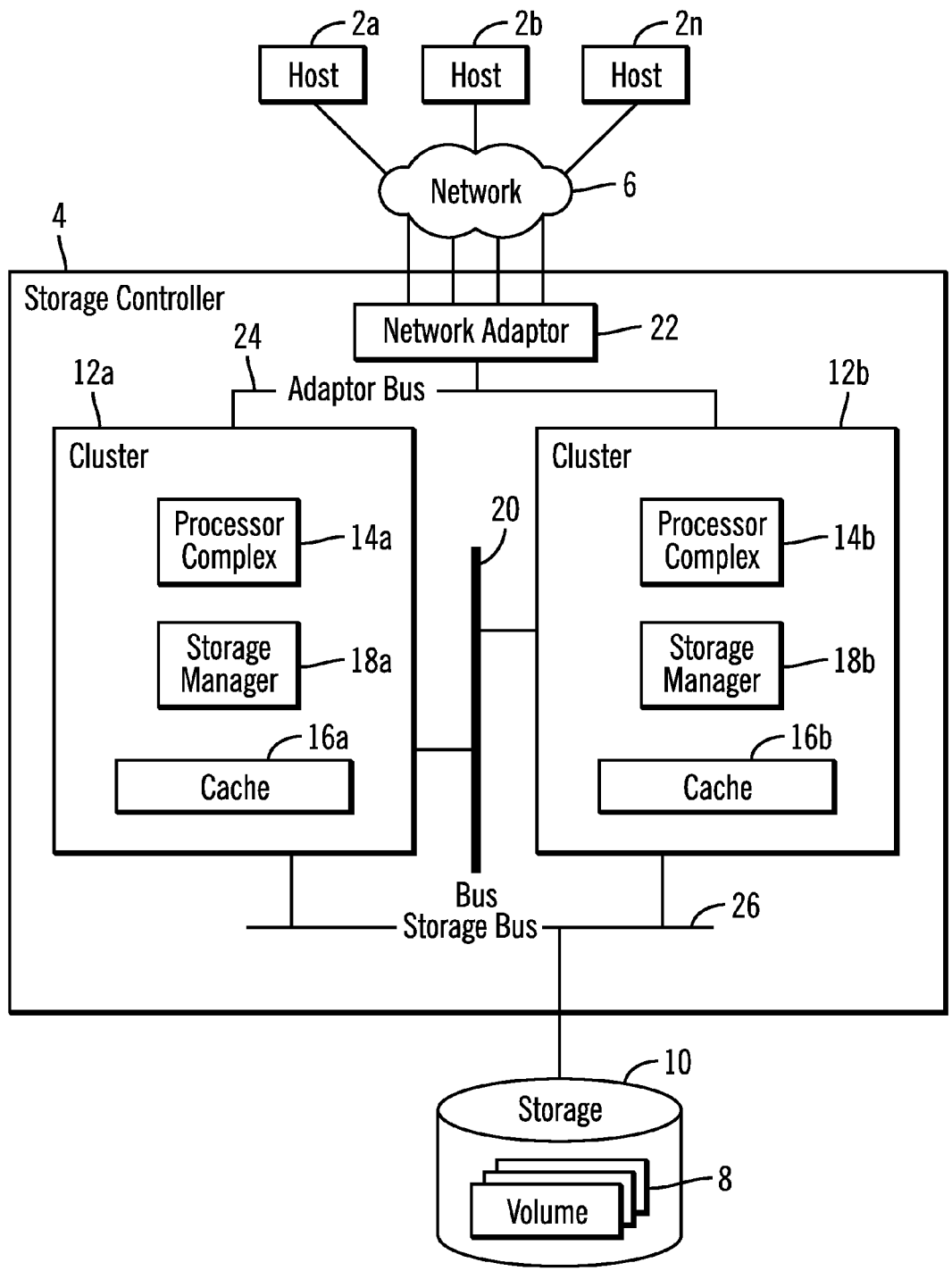
FIG. 1 illustrates an embodiment a storage computing environment.

FIG. 1 illustrates an embodiment of a computing environment. A plurality of hosts 2a, 2b . . . 2n may submit Input/Output (I/O) requests to a storage controller 4 over a network 6 to access data at volumes 8 (e.g., Logical Unit Numbers, Logical Devices, Logical Subsystems, etc.) in a storage 10. The storage controller 2 includes at least two clusters 12a, 12b. Each cluster 8a, 8b includes a processor complex 14a, 14b including one or more processors with single or multiple cores, a cache 16a, 16b for caching data transferred between the hosts 2a, 2b . . . 2n and the storage 10, and a storage manager 18a, 18b for managing the transfer of data transferred between the hosts 2a, 2b . . . 2n and the storage 10. The storage managers 18a, 18b may also maintain an assignment of volumes 8 to clusters 12a, 12b owning a volume or group of volumes in the attached storage 8, such that an owner cluster 12a, 12b handles the writes to those volumes 8 that cluster owns by caching the write data and executing the write against the volume.

The clusters 12a, 12b receive I/O requests from the hosts 2a, 2b . . . 2n and buffer the requests and write tracks in their respective cache 16a, 16b. A track may comprise any unit of data configured in the storage 10, such as a track, Logical Block Address (LBA), etc., which is part of a larger grouping of tracks, such as a volume, logical device, etc.

The storage manager 18a, 18b may comprise one or more programs loaded into a memory that are executed by the processor complex 14a, 14b or may be implemented in hardware devices in the clusters 12a, 12b, such as in Application Specific Integrated Circuits (ASIC). In one embodiment, the caches 16a, 16b may comprise a volatile storage.

A communication bus 20 provides a communication interface to enable communication between the clusters 12a, 12b, and may utilize communication interface technology known in the art, such as Peripheral Component Interconnect (PCI) bus or other bus interfaces, or a network communication interface. Further, the bus 20 may comprise a processor Symmetrical Multi-Processor (SMP) fabric comprising busses, ports, logic, arbiter, queues, etc. to enable communication among the cores and components in the processor complexes 10a, 10b.

The clusters 12a, 12b communicate with the network 6 via one or more shared network adaptors 22 that provide separate connection lines to the network 6. The adaptor 22 is in communication with both clusters 12a, 12b over an adaptor bus 24. The clusters 12a, 12b are both capable of accessing volumes 8 in the storage 10 over a shared storage bus 26. The busses 24 and 26 may utilize a suitable storage communication interface known in the art, such as the PCI interface.

In one embodiment, the clusters 12a, 12b in the storage controller 4 may comprise separate processing systems, and may be on different power boundaries and implemented in separate hardware components, such as each cluster implemented on a separate motherboard. In an alternative embodiment, the clusters 12a, 12b may comprise virtual or logical devices having logical components implemented on a shared hardware platform.

The storage 10 may comprise an array of storage devices, such as a Just a Bunch of Disks (JBOD), Direct Access Storage Device (DASD), Redundant Array of Independent Disks (RAID) array, virtualization device, tape storage, flash memory, solid state storage devices (e.g., EEPROM (Electrically Erasable Programmable Read-Only Memory), flash memory, storage-class memory (SCM)), electronic memory, magnetic tape media, etc.

The network 6 may comprise a Storage Area Network (SAN), a Local Area Network (LAN), a Wide Area Network (WAN), the Internet, and Intranet, etc.

Figure 2:
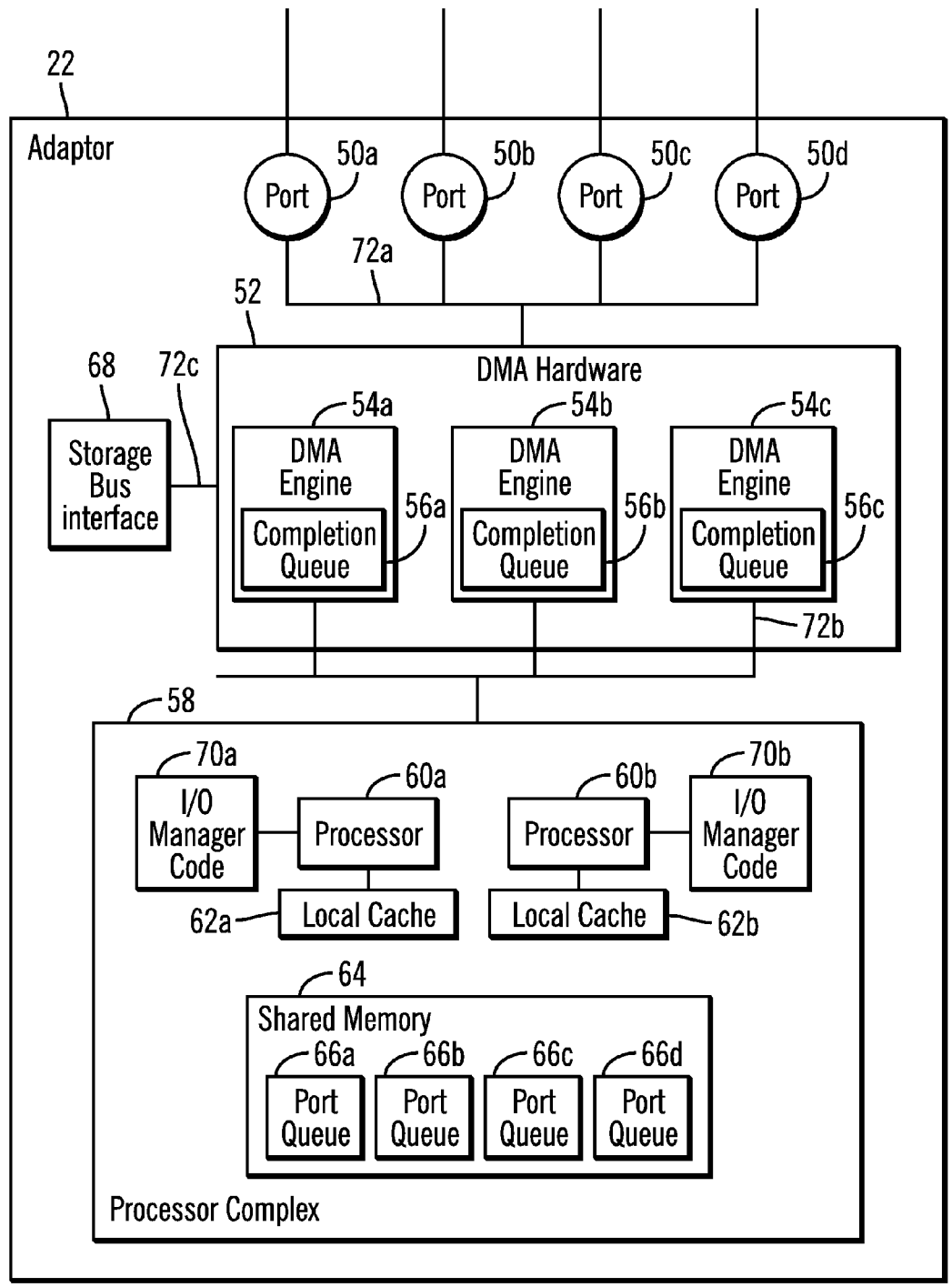
FIG. 2 illustrates an embodiment of an adaptor.

FIG. 2 illustrates an embodiment of a network adaptor 22. The network adaptor 22 includes a plurality of ports 50a, 50b, 50c, 50d that provide separate physical connections to the network 6, where a separate network cable may connect to each port 50a, 50b, 50c, 50d. Hosts 2a, 2b, 2c, 2d may communicate I/O requests to the clusters 12a, 12b via paths configured through the ports 50a, 50b, 50c, 50d. In an alternative embodiment, the ports 50a, 50b, 50c, 50d may comprise logical ports representing physical connections to the network 6. Direct Memory Access (DMA) hardware 52 has a plurality of DMA engines 54a, 54b, 54c, that each may include a completion queue 56a, 56b, 56c queuing I/O completes for I/O requests processed by the DMA engines 54a, 54b, 54c. The queues 56a, 56b, 56c may comprise LIFO (Last-in-First-Out) queues where the oldest queued I/O complete is accessed. The DMA hardware 52 may comprise an Application Specific Integrated Circuit (ASIC) on which the DMA engines 54a, 54b, 54c are implemented. Alternatively, the DMA engines 54a, 54b, 54c may be implemented on multiple ASICs.

A processor complex 58 includes a plurality of processors 60a, 60b, each having a local cache 62a, 62b, such as an on-board L1 cache. The processors 60a, 60b may access a shared memory 64, such as an L2 cache, having a plurality of port queues 66a, 66b, 66c, 66d, one for each port 50a, 50b, 50c, 5d, respectively. The port queues 66a, 66b, 66c, 66d queue I/O completes taken from the DMA engine completion queues 56a, 56b, 56c by the processors 60a, 60b to process in the queue order. The queues 66a, 66b, 66c, 66d may comprise LIFO queues. The processors 60a, 60b communicate with the ports 50a, 50b, 50c, 50d and the clusters 12a, 12b via the DMA hardware 52 The processors 60a, 60b may comprise separate cores on a single Central Processing Unit (CPU) or comprise separate CPUs. Each processor 60a, 60b is associated with I/O manager code 70a, 70b, respectively, that the processors 60a, 60b execute to perform I/O request management operations in the adaptor 22. In one embodiment, the I/O manager code 70a, 70b may be implemented in a non-volatile memory or storage device, such as a Read Only Memory (ROM), solid state storage device, non-volatile random access memory (NVRAM), etc.

A storage bus interface 68 provides the interface from the adaptor 22 components to the adaptor bus 24. Bus 72a provides a communication interface between the ports 50a, 50b, 50c, 50d and the DMA hardware 52a, including DMA engines 54a, 54b, 54c, bus 72b provides communication between the DMA engines 54a, 54b, 54c and the processors 60a, 60b, and bus 72c connects the DMA hardware 52 and DMA engines 54a, 54b, 54c to the storage bus interface 68. The busses 72a, 72b, and 72c may use suitable bus interface technology known in the art, such as PCI. Further the busses 72a, 72b, 72c may be implemented as fewer or more busses than shown.

The DMA engines 54a, 54b, 54c may provide for the transfer of data between the ports 50a, 50b, 50c, 50d and the clusters 12a, 12b independently of the processors 60a, 60b. The adaptor 22 may include a memory in which the DMA engines 54a, 54b, 54c buffer requested read data received from the clusters 12a, 12b or buffer write data for write requests pending transfer to the clusters 12a, 12b. The DMA engines 54a, 54b, 54c queue an I/O complete when completing a transfer of data to or from the clusters 12a, 12b as part of an I/O request received on the ports 50a, 50b, 50c, 50d. The processors 60a, 60b process I/O completes queued on the port queues 66a, 66b, 66c, 66d. If the I/O complete is for a read request, indicating that the DMA engine 54a, 54b, 54c has completed the transfer of data from the cluster 12a, 12b, then the processors 60a, 60b may inform the ports 50a, 50b, 50c, 50d that the data is now residing in the adaptor 22, such as in the DMA engine 54a, 54b, 54c, and the port 50a, 50b, 50c, 50d may then access the data to transfer to the host 2a, 2b . . . 2n over the network. If the I/O complete is for a write request indicating the DMA engine 54a, 54b, 54c completed the transfer of the write data to the cluster cache 16a, 16b, then the processor 60a, 60b returns write complete to the port 50a, 50b, 50c, 50d on which the read request was received to return to the initiating host 2a, 2b . . . 2n.

FIG. 2 shows a certain number of instances of elements, such as ports 50a, 50b, 50c, 50d, DMA engines 54a, 54b, 54c, processors 60a, 60b, and queues. In further embodiments there may be a different number of these elements in different adaptor 22 implementations, such as more or fewer ports and DMA engines, more processors, etc.

Figure 3:
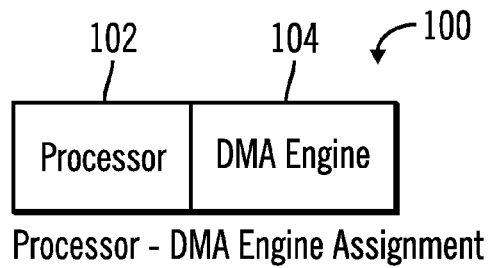
FIG. 3 illustrates an embodiment of a processor-DMA engine assignment.

FIGS. 3-6 illustrate information maintained in the adaptor 22 to manage the processing of I/O requests. FIG. 3 illustrates an instance of a processor-DMA engine assignment 100 indicating a processor 102 assigned to a DMA engine 104, such that the assigned processor may only process I/O completes for the assigned DMA engine 104. The assignment may express an affinity of a DMA engine for a processor. Further, a processor 60a, 60b may select the assigned DMA engine 104 to process I/O requests received at the ports 50a, 50b, 50c, 50d. The processor-DMA engine assignment 100 may be maintained in the processor local cache 62a, 62b of the processor 60a, 60b to which the assignment relates, or some other location in the adaptor 22.

Figure 4:
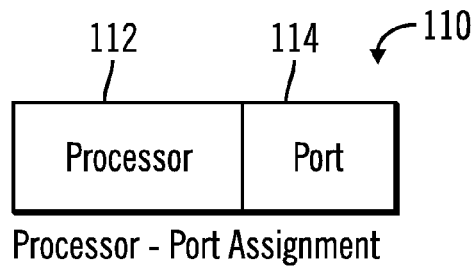
FIG. 4 illustrates an embodiment of a processor-port assignment.

FIG. 4 illustrates an instance of a processor-port assignment 110 indicating a processor 112 assigned to a port 114, such that the assigned processor 112 only processes I/O requests received at the assigned port 114. In certain embodiments, the ports 50a, 50b, 50c, 50d may be divided evenly among the available processors 60a, 60b. The processor-port assignment 110 may be maintained in the processor local cache 62a, 62b of the processor 60a, 60b to which the assignment relates.

With the processor-DMA engine assignment 100 and processor-port assignment 110, I/O requests received at a port 50a, 50b, 50c, 50d are processed by the same assigned processor 60a, 60b and DMA engine 54a, 54b, 54c.

Figure 5:
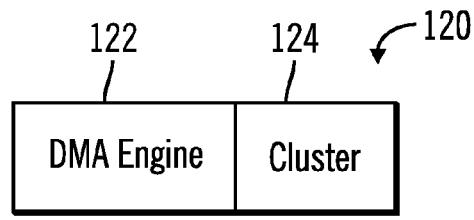
FIG. 5 illustrates an embodiment of a DMA engine-cluster assignment.

FIG. 5 illustrates an embodiment of a DMA engine-cluster assignment 120 indicating a DMA engine 122 assigned to a cluster 124, such that the assigned DMA engine 122 only processes I/O requests directed to storage locations managed by the assigned cluster 124. In certain embodiments, not all of the DMA engines 54a, 54b, 54c are assigned to process I/O requests in the processor DMA-engine 100 and DMA engine-cluster 120 assignments. One or more of the DMA engines 54a, 54b, 54c may be allocated to handle overflow work if other of the DMA engines 54a, 54b, 54c are overburdened, and in such case those overflow DMA engines 54a, 54b, 54c may be left unassigned in the assignments 100 and 120.

Figure 6:
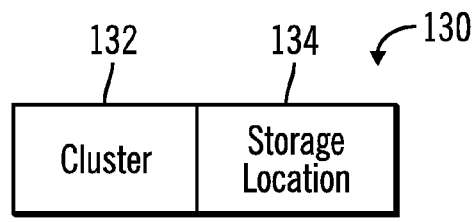
FIG. 6 illustrates an embodiment of a cluster-storage location engine assignment.

FIG. 6 illustrates an embodiment of a cluster-storage location assignment 130 indicating a cluster 132 assigned to a storage location 134, such that the assigned cluster 132 handles I/O requests directed to the assigned storage location 134, where a storage location 124 may comprise a volume, logical device, logical subsystem or any other unit of logical or physical storage to which an I/O request may be directed.

The DMA engine-cluster 120 and cluster-storage location 130 assignments provide an alternative selection for assigning I/O requests to DMA engines 54a, 54b, 54c than the processor-DMA engine assignment 100. The assignments 120 and 130 are used by determining from the I/O request the target storage location, and then from the cluster-storage location assignment 130 determining the cluster 132 assigned to process I/O requests to the target storage location, and then from the DMA engine-cluster assignment 120 determining the DMA engine 122 assigned to process I/O requests for that cluster.

The DMA-engine-cluster and cluster-storage location 130 assignments may be maintained in the processor shared memory 64 to be accessible to either processor 60a, 60b to determine the DMA engine 54a, 54b, 54c to select for an I/O request.

In an alternative embodiment, the assignments 100, 110, 120, and 130 may be stored in locations other than described above.

Further, in an alternative embodiment, the processors 60a, 60b may not use the assignment 100, 110, 120, and 130 data structures to determine ports 50a, 50b, 50c, 50d assigned to processors 60a, 60b, processors 60a, 60b assigned to DMA engines 54a, 54b, 54c, and DMA engines 54a, 54b, 54c assigned to clusters 12a, 12b. Instead, the I/O manager code 70a, 70b may include instructions implementing an algorithm that determines the affinity or assignment of components based on an identifier of the components. For instance, in one embodiment, the I/O manager code 70a, 70b may include instructions to assign a first 60a and second 60b identified processors to have affinity for a first and second half of the ports and DMA engines, respectively, and that assigns a first 54a and second 54b identified DMA engines to have affinity for a first 12a and second 12b identified clusters, respectively. Components would have a preference to select those components with which they have affinity or are assigned.

Figure 7:
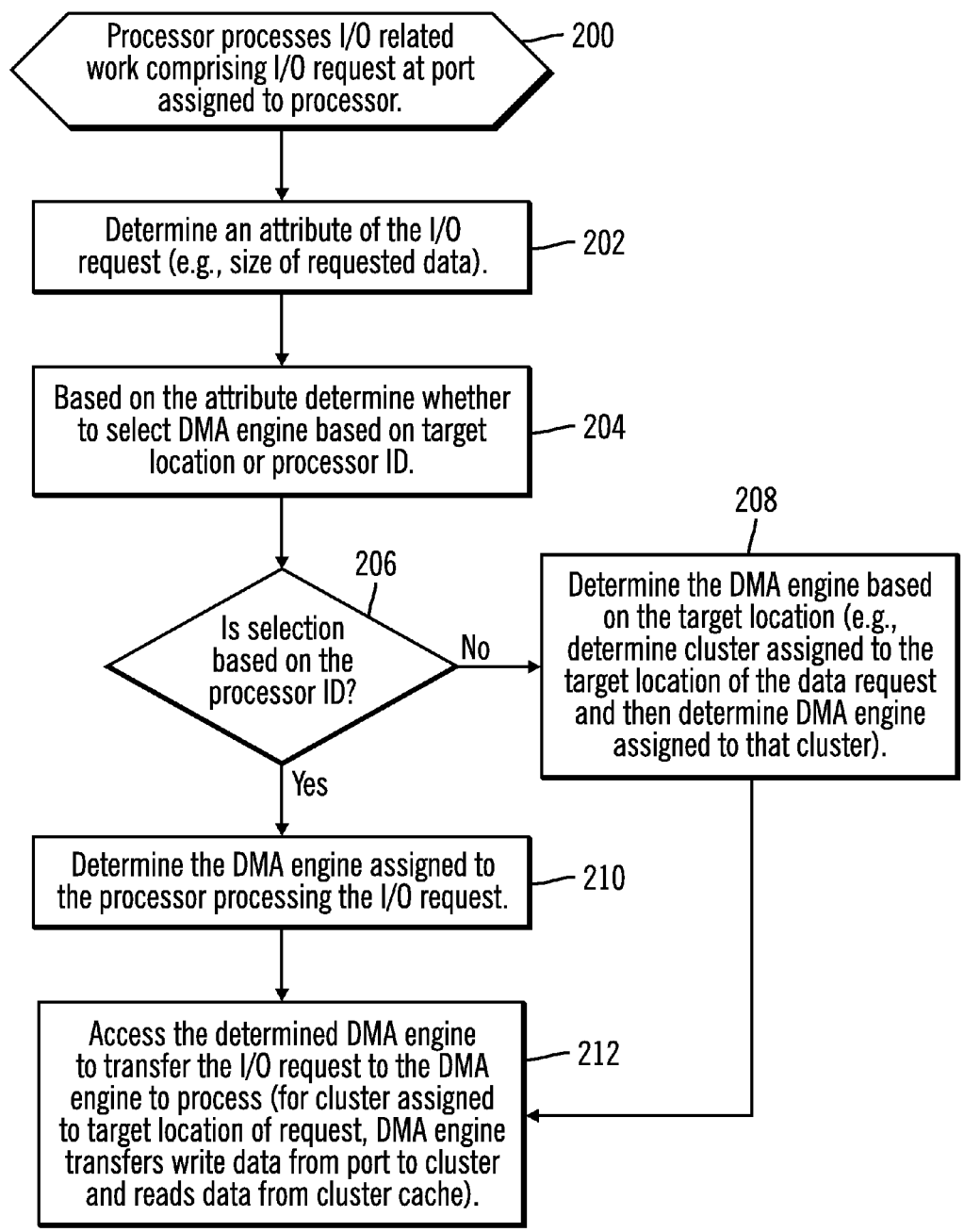
FIG. 7 illustrates an embodiment of operations to process I/O requests received at a port.

FIG. 7 illustrates an embodiment of operations implemented in each I/O manager code 70a, 70b executed by the processors 60a, 60b to process I/O requests received at the ports 50a, 50b, 50c, 50d. Processors 60a, 60b, executing the I/O manager code 70a, 70b, may only process I/O requests from ports 50a, 50b, 50c, 50d to which they are assigned according to the processor-port assignment 110 (FIG. 4) information they maintain in their local cache 62a, 62b. Upon processing (at block 200) I/O related work at an assigned port 50a, 50b, 50c, 50d, such as the I/O request, the processor 60a, 60b determines (at block 202) an attribute of the I/O request.

In certain embodiments, the considered attribute may comprise a size of the requested read or write data. Based on the determined attribute, the processor 60a, 60b determines (at block 204) whether to select the DMA engine 54a, 54b, 54c using the target location or the processor 60a, 60b identifier (ID). In one embodiment, when the I/O request attribute comprises the requested size of the data, then if the size of the data is less than a threshold, the processor-DMA engine assignment 100 is used to determine the DMA engine 54a, 54b, 54c with which the processor 60a, 60b has affinity. If the data size is greater than the predetermined threshold, then the DMA engine cluster-assignment is used to select the DMA engine 54a, 54b, 54c that will handle the I/O request, i.e., transfer the write data or retrieve the read data. In one embodiment, the predetermined threshold may comprise 16 KB.

If (at block 206) the selection is based on the processor identifier, i.e., the processor-DMA engine assignment 100, then the processor 60a, 60b determines (at block 210) the DMA engine 54a, 54b, 54c assigned to the processor 60a, 60b processing the request. If (at block 206) the selection is based on the cluster 12a, 12b to which the I/O request will be directed, then the processor 60a, 60b determines (at block 208) the DMA engine 50a, 50b, 50c, 50d based on the target location of the requested data in the storage 10. The cluster 12a, 12b assigned to the target location (e.g., volume, LSS, etc) of the data request may be determined from the cluster-storage location assignment 130 and then DMA engine 54a, 54b, 54c assigned to that determined cluster 12a, 12b may be determined from the DMA engine-cluster assignment 120. After determining the DMA engine 54a, 54b, 54c to use, the processor 60a, 60b accesses (at block 212) the determined DMA engine 54a, 54b, 54c to transfer the I/O request to the determined DMA engine 54a, 54b, 54c to process. The DMA engine then transfers write data to or retrieves read data from the cache 16a, 16b of the cluster 12a, 12b assigned to the target location of the I/O request.

As discussed, the DMA engine 54a, 54b, 54c adds an I/O complete to the completion queue 56a, 56b, 56c after transferring write data to the cluster cache 16a, 16b (or storage 10) and adds an I/O complete to the completion queue 56a, 56b, 56c after the requested read data is sent from the cluster 12a, 12b to the DMA engine 54a, 54b, 54c.

Figure 8:
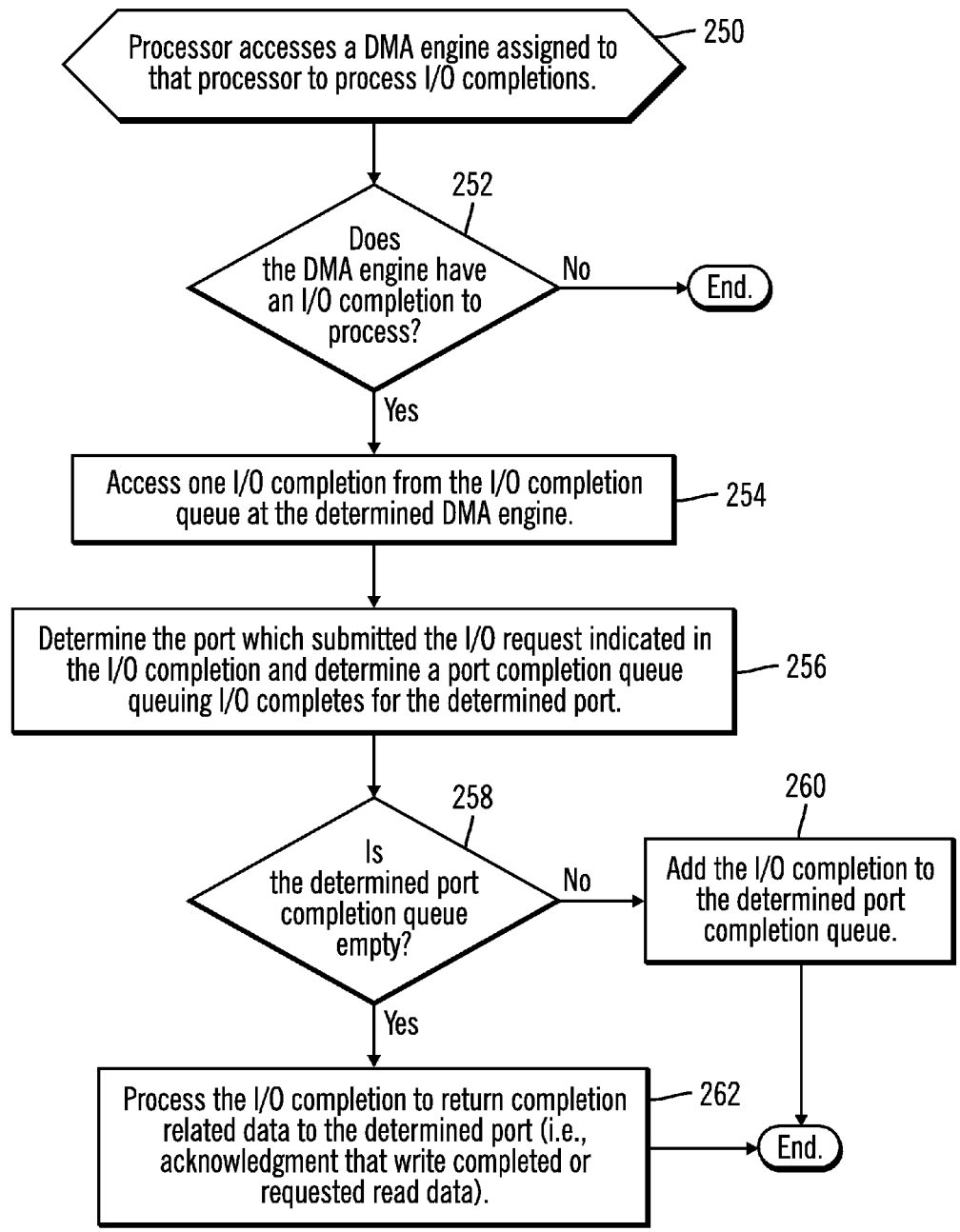
FIG. 8 illustrates an embodiment of operations to process I/O completes at DMA engines.

FIG. 8 illustrates an embodiment of operations implemented in the I/O manager code 70a, 70b executed by the processors 60a, 60b to process I/O completions in the DMA engine completion queues 56a, 56b, 56c. The processors 60a, 60b, executing the I/O manager code 70a, 70b, may cycle through and consider each DMA engine 54a, 54b, 54c and then access (at block 250) a DMA engine 54a, 54b, 54c assigned to the processor, such as indicated in the processor-DMA engine assignment 100. If (at block 252) the completion queue 56a, 56b, 56c in the DMA engine 54a, 54b, 54c has an I/O completion to process, the processor 60a, 60b accesses (at block 254) one I/O completion from the I/O completion queue 56a, 56b, 56c at the determined DMA engine 54a, 54b, 54c. If (at block 252) the accessed DMA engine 54a, 54b, 54c does not have an I/O completion to process, control ends. The processor 60a, 60b determines (at block 256) the port 50a, 50b, 50c, 5d which submitted the I/O request indicated in the I/O completion and determines a port completion queue 66a, 66b, 66c, 66d queuing I/O completes for the determined port 66a, 66b, 66c, 66d. If (at block 258) the determined port completion queue 66a, 66b, 66c, 66d is empty, then the processor 60a, 60b directly processes (at block 262) the I/O completion pulled from the DMA engine completion queue 56a, 56b, 56c to return completion related data to the determined port 50a, 50b, 50c, 50d, which may comprise returning an acknowledgment that a write completed for a write request or returning requested read data for a read request. If the determined port completion queue 66a, 66b, 66c, 66d is not empty, then the processor 60a, 60b adds (at block 260) the I/O completion to the determined port completion queue 66a, 66b, 66c, 66d.

A processor 60a, 60b would process the port queue 66a, 66b, 66c, 66d for the ports 54a, 54b, 54c, 54d for which the processor 60a, 60b is associated, such as indicated in the processor-port assignment 110. The processor 60a, 60b would access an I/O complete from the port queue 66a, 66b, 66c, 66d to process, and then return completion related data to the determined port 50a, 50b, 50c, 50d, which may comprise returning an acknowledgment that a write completed for a write request or returning requested read data for a read request.

In the embodiments described with respect to FIG. 1 and the operations of FIGS. 7 and 8, the adaptor is transferring I/O requests to dual clusters 12a, 12b of a dual cluster system. In an alternative embodiment, the adaptor of FIG. 2 and the operations described with respect to FIGS. 7 and 8 may be performed in a single cluster system such that the I/O requests are sent to a single cluster including a processor and cache.

With the described embodiment, the processors may select a DMA engine based on an optimization concerning an attribute of the data request. For instance, for relatively smaller size data requests, it is optimal to select a DMA engine based on the processor ID so that the processor can process I/O completions for smaller size data requests from the DMA engine assigned to the port-processor pair, so that the same processor is processing the I/O requests for the same port. In this way, for smaller requests, the processor does not have to continually switch to processing I/O requests for a different port, which requires the processor to change context and load new port information and settings into the local cache to process I/O requests for a different port. Restricting the processor to processing I/O completes for smaller size I/O requests from the port also assigned to the processor allows the processor to avoid cache thrashing by having to load new port settings and data into the processor cache to process I/O requests for a different port. However, for larger I/O requests, described embodiments select the DMA engine based on the target storage location of the I/O request so that the same DMA engine handles large data transfers for the same target storage location or sequential storage locations to optimize the transfer of data between the DMA engine in the adaptor 22 and the clusters 12a, 12b.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 7 and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data in a network adaptor having a plurality of processors, a plurality of direct memory access (DMA) engines, and a plurality of ports coupled to a network to manage data transfer requests directed to a storage, the computer program product comprising a computer readable storage medium having computer readable program code embodied therein that is executed to perform operations in the network adaptor, the operations comprising:
   maintaining an assignment of the processors to the DMA engines, wherein each of the processors is assigned to use one of the DMA engines;
   processing, by one of the processors, I/O request related work for a received data transfer request directed to the storage;
   in response to a size of the data transfer request being less than a predetermined threshold, selecting the DMA engine assigned to the processor processing the I/O request related work;
   in response to the size of the data transfer request being greater than the predetermined threshold, selecting one of the DMA engines based on a target location in the storage to which the data transfer request is directed; and
   accessing, by the processor, the selected DMA engine to perform the I/O related work.

2. The computer program product of claim 1, wherein the operations further comprise:
   determining an assignment of the processors to the ports, wherein each of the ports are assigned to one processor, and wherein the processors process I/O related work for I/O requests received at the ports to which they are assigned.

3. The computer program product of claim 1, wherein the operations further comprise:
   determining an assignment of the DMA engines to processing clusters, wherein each of the DMA engines is assigned to one processing cluster;
   wherein determining one of the DMA engines based on the target location comprises:
      determining the processing cluster assigned to process the target location in the storage; and
      determining the DMA engine assigned to the determined processing cluster.

4. The computer program product of claim 1, wherein the I/O related work comprises processing I/O completions at the DMA engines, and wherein the processor accesses the determined DMA engine by performing:
   accessing one I/O completion from the determined DMA engine;
   determining one of the ports which submitted the I/O request indicated in the I/O completion;

determining a port completion queue associated with the determined port; and adding the I/O completion to the determined port completion queue.

5. The computer program product of claim 4, wherein the operations further comprise:

determining whether the determined port completion queue is empty, wherein the I/O completion is added to the determined port completion queue in response to determining that the determined port completion queue is not empty; and in response to determining that the determined port completion queue is empty, processing the I/O completion to return completion related data on the determined port.

6. The computer program product of claim 1, wherein accessing, by the processor, the determined DMA engine comprises:

sending write data from a write request to the determined DMA engine to forward to the storage to write;

returning complete, from the determined DMA engine completing the transfer of the write data, on the port on which the write request was received; and retrieving data for an I/O read request from the determined DMA engine to return on the port on which the I/O read request was received.

7. A network adaptor coupled to a network to manage Input/Output (I/O) requests directed to a storage, comprising:

a plurality of processors;
a plurality of direct memory access (DMA) engines;
a plurality of ports;
a computer readable storage medium having computer readable program code embodied therein that is executed to perform operations, the operations comprising:

maintaining an assignment of the processors to the DMA engines, wherein each of the processors is assigned to use one of the DMA engines;

processing, by one of the processors, I/O request related work for a received data transfer request directed to the storage;

in response to a size of the data transfer request being less than a predetermined threshold, selecting the DMA engine assigned to the processor processing the I/O request related work;

in response to the size of the data transfer request being greater than the predetermined threshold, selecting one of the DMA engines based on a target location in the storage to which the data transfer request is directed; and accessing, by the processor, the selected DMA engine to perform the I/O related work.

8. The network adaptor of claim 7, wherein the I/O related work comprises processing I/O completions at the DMA engines, and wherein the processor accesses the determined DMA engine by performing:

accessing one I/O completion from the determined DMA engine;

determining one of the ports which submitted the I/O request indicated in the I/O completion;

determining a port completion queue associated with the determined port; and adding the I/O completion to the determined port completion queue.

9. The network adaptor of claim 8, wherein the operations further comprise:

determining whether the determined port completion queue is empty, wherein the I/O completion is added to the determined port completion queue in response to determining that the determined port completion queue is not empty;

in response to determining that the determined port completion queue is empty, processing the I/O completion to return completion related data on the determined port.

10. A system in communication with a storage, comprising:

a storage controller including a plurality of processing clusters to manage Input/Output (I/O) requests directed to the storage;

a network adaptor coupled to the clusters, comprising:
a plurality of processors;
a plurality of direct memory access (DMA) engines;
a plurality of ports;
a computer readable storage medium having computer readable program code embodied therein that is executed to perform operations, the operations comprising:

maintaining an assignment of the processors to the DMA engines, wherein each of the processors is assigned to use one of the DMA engines;

processing, by one of the processors, I/O request related work for a received data transfer request directed to the storage;

in response to a size of the data transfer request being less than a predetermined threshold, selecting the DMA engine assigned to the processor processing the I/O request related work;

in response to the size of the data transfer request being greater than the predetermined threshold, selecting one of the DMA engines based on a target location in the storage to which the data transfer request is directed; and accessing, by the processor, the selected DMA engine to perform the I/O related work.

11. The system of claim 10 wherein the selecting one of the DMA engines based on the target location comprises:

determining an assignment of the DMA engines to processing clusters, wherein each of the DMA engines is assigned to one processing cluster;

determining the processing cluster assigned to process the target location in the storage;

determining the DMA engine assigned to the determined processing cluster.

12. A method for managing data in a network adaptor coupled to a network connected to a storage, comprising:

maintaining an assignment of a plurality of processors to Direct Memory Access (DMA) engines, wherein each of the processors is assigned to use one of the DMA engines;

processing I/O request related work for a received data transfer request directed to the storage;

in response to a size of the data transfer request being less than a predetermined threshold, selecting the DMA engine assigned to the processor processing the I/O request related work;

in response to the size of the data transfer request being greater than the predetermined threshold, selecting one of the DMA engines based on a target location in the storage to which the data transfer request is directed; and accessing the selected DMA engine to perform the I/O related work.

13. The method of claim 12, wherein the I/O related work comprises processing I/O completions at the DMA engines, and wherein the accessing the determined DMA engine further comprises:
- accessing one I/O completion from the determined DMA engine;
- determining one of the ports which submitted the I/O request indicated in the I/O completion;
- determining a port completion queue associated with the determined port; and
- adding the I/O completion to the determined port completion queue.

14. The method of claim 13, further comprising:
- determining whether the determined port completion queue is empty, wherein the I/O completion is added to the determined port completion queue in response to determining that the determined port completion queue is not empty;
- in response to determining that the determined port completion queue is empty, processing the I/O completion to return completion related data on the determined port.

* * * * *